Figure 1:
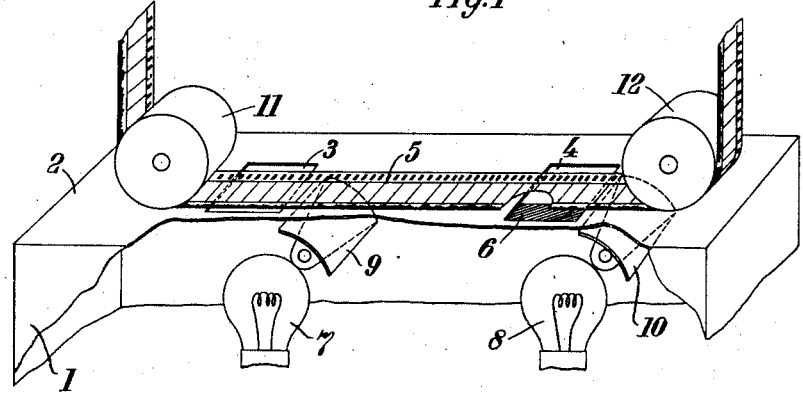

June 18, 1940.  J. EGGERT ET AL  2,204,668
PICTURE SOUND FILM
Filed July 13, 1938

Inventors
John Eggert
Hans Friedrich Nissen
By Their Attorneys

Patented June 18, 1940

2,204,668

UNITED STATES PATENT OFFICE 2,204,668

PICTURE SOUND FILM

John Eggert, Leipzig, and Hans Friedrich Nissen, Dessau, Germany, assignors, by mesne assignments, to General Aniline & Film Corporation, New York, N. Y., a corporation of Delaware Application July 13, 1938, Serial No. 219,006
In Germany July 19, 1937

2 Claims. (Cl. 95—75)

Our present invention relates to picture sound films and more particularly to such films, which are produced by reversal development.

It is known practice in the case of picture films to control the second exposure in a reversal development operation in dependence on the density of the image produced by the first development. If the picture film carries also a sound track it is necessary to use two separate apparatus for the second exposures of the sound track and the picture record, since the picture image and the sound track are in general obtained under different conditions of illumination and, therefore, have different degrees of density.

It is one object of this invention to provide a process for overcoming this disadvantage.

Another object of the invention is the provision of a process in which both the sound track and the picture record are subjected to the same constant second exposure, which is such that the sound track has a sufficient minimum of density.

A further object of the invention is to provide a process of this kind in which the picture record is subjected to an additional exposure, which is controlled in dependence on the density of the image obtained by the first development. As a minimum density a density of 1.8 may be considered, which is obtained after the development of the film that has not been subjected to a first exposure.

Yet another object of the invention is to provide a device for practising the process, which has two exposure windows.

Other objects, features and details of the invention will be apparent from the following description and the accompanying drawing illustrating an embodiment of the invention.

Figure 2:
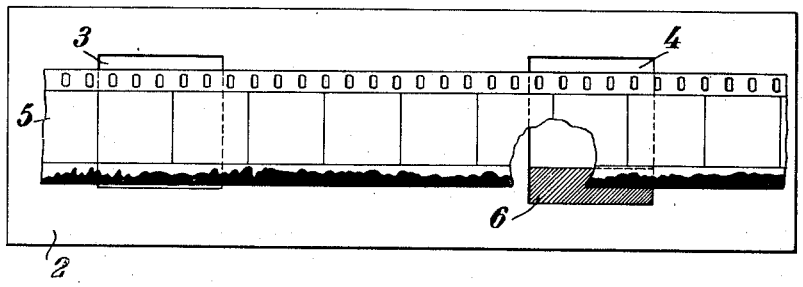

In the drawing:

Fig. 1 is a perspective view showing an apparatus constructed in accordance with our invention, and Fig. 2 is a plan view showing a detail of the apparatus.

The first window of the device is so shaped that the whole film is illuminated by a constant source of light, while in the second window merely the picture record is illuminated. The second window may be of the same dimensions as the first, in which case care is taken that the sound strip is covered by a diaphragm during the exposure at this window.

Referring now to the figures, 1 is a casing closed at the top by a cover 2. In this cover are windows 3 and 4 above which a picture sound film 5 travels. The windows are at least as broad as the film. In the window 4 is a fixed diaphragm or mask 6 which covers the sound strip. Within the casing are two lamps 7 and 8. Above the lamp 7 is an adjustable diaphragm 9 by means of which the window 3 can be wholly or partly covered. A similar diaphragm 10 is mounted above the lamp 8 and this can wholly or in part cover the window 4. The illumination of the window 4 may be controlled by a known device not here shown (as, for instance, described in French specification No. 789,178, U. S. Patent No. 2,101,932 dated December 14, 1937, and U. S. Patent application Ser. No. 186,944 filed January 26, 1938) in dependence on the density of the image produced by the first development. 11 and 12 are transport rollers for the film. Instead of lamps 7 and 8 there may obviously be a single source of light.

What we claim is:

1. A device for producing a picture sound film by a reversal development comprising a casing, a cover closing said casing, two windows arranged in said cover and being at least as broad as said film, one of said windows being provided with a fixed mask adapted to cover the sound strip of said film, means for illuminating said windows, means for controlling the illumination of said window provided with said fixed mask in dependence on the density of the picture record on the developed but unfixed film being passed over said windows, and means for feeding said film above said windows.

2. A device for producing a picture sound film by a reversal development comprising a casing, a cover closing said casing, two windows arranged in said cover and being at least as broad as said film, one of said windows being provided with a mask adapted to cover the sound strip of said film, a lamp under each of said windows, adjustable diaphragms positioned between said windows and said lamps, means for controlling the illumination of said window provided with said mask in dependence on the density of the picture record on the developed but unfixed film being passed over said windows and rollers arranged on said cover and adapted to feed said film above said windows.

JOHN EGGERT.
HANS FRIEDRICH NISSEN.